(12) United States Patent  (10) Patent No.: US 8,708,366 B2
Clark et al.  (45) Date of Patent: Apr. 29, 2014

(54) VEHICLE SIDE IMPACT DETECTION USING VEHICLE YAW

(75) Inventors: Todd N. Clark, Dearborn, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 13/482,050

(22) Filed: May 29, 2012

(65) Prior Publication Data

US 2013/0320654 A1 Dec. 5, 2013

(51) Int. Cl.
B60R 21/0132 (2006.01)
B60R 21/0136 (2006.01)

(52) U.S. Cl.
USPC .............. 280/735; 180/274; 180/282; 701/45

(58) Field of Classification Search
USPC ........... 180/274, 282; 280/735, 730.2; 701/45
See application file for complete search history.

(56) References Cited

U.S. PATENT DOCUMENTS

| 6,394,495 | B1* | 5/2002 | Specht | 280/806 |
| 7,052,038 | B2 | 5/2006 | Breed et al. | |
| 7,206,680 | B2* | 4/2007 | Roelleke | 701/45 |
| 7,726,684 | B2 | 6/2010 | Breed | |
| 8,086,376 | B2* | 12/2011 | McCoy et al. | 701/46 |
| 2003/0182041 | A1* | 9/2003 | Watson | 701/45 |
| 2004/0039509 | A1* | 2/2004 | Breed | 701/45 |
| 2004/0254729 | A1* | 12/2004 | Browne et al. | 701/301 |
| 2006/0100762 | A1* | 5/2006 | Matsunaga et al. | 701/45 |
| 2007/0276566 | A1* | 11/2007 | Diebold et al. | 701/45 |
| 2008/0208413 | A1* | 8/2008 | Willig et al. | 701/45 |
| 2010/0198446 | A1* | 8/2010 | Erb et al. | 701/29 |
| 2010/0305818 | A1* | 12/2010 | Doerr et al. | 701/46 |
| 2011/0040451 | A1* | 2/2011 | Lee et al. | 701/45 |
| 2011/0125372 | A1* | 5/2011 | Ito | 701/45 |
| 2011/0153164 | A1* | 6/2011 | Hiemer et al. | 701/45 |
| 2011/0202241 | A1* | 8/2011 | Le et al. | 701/46 |
| 2012/0265406 | A1* | 10/2012 | Lang et al. | 701/45 |

FOREIGN PATENT DOCUMENTS

JP 2004182172 A 7/2004

* cited by examiner

*Primary Examiner* — Paul N Dickson
*Assistant Examiner* — George Spisich
(74) *Attorney, Agent, or Firm* — Frank A. MacKenzie; Brooks Kushman P.C.

(57) ABSTRACT

A safety system for a motor vehicle includes a sensor suite detecting a lateral impact and a vehicle yaw, an occupant safety system, and a control module receiving signals from the sensor suite. The control module activates the occupant safety system if either: a) an impact magnitude detected by the sensor suite is greater than a first impact threshold and a vehicle yaw magnitude detected by the sensor suite is greater than a yaw threshold; or b) the impact magnitude is greater than a second impact threshold higher than the first impact threshold. The system may be operated to determine a longitudinal location of the impact on the vehicle by comparing a magnitude of the impact and a magnitude of the vehicle yaw. The occupant safety system may then be activated in a mode based upon the longitudinal location of the impact and/or appropriate for a spinning vehicle.

19 Claims, 3 Drawing Sheets

VEHICLE SIDE IMPACT DETECTION USING VEHICLE YAW

TECHNICAL FIELD

The present invention relates to occupant safety systems for motor vehicle and to a system and method for detecting and classifying lateral impacts on a vehicle based upon vehicle yaw velocity caused by an impact.

BACKGROUND

Modern motor vehicles commonly feature occupant safety systems including, for example, seat belts, frontal collision airbags, side airbags, and curtain airbags. One or more sensors on-board the vehicle feed signals to an electronic control module which, based on the signals, detects a collision or other unsafe condition so that restraints and/or other safety systems may be activated.

A typical passenger vehicle has two rows of seats for the driver and passengers, and such vehicles often are equipped with a side impact sensor located in, on, or adjacent to the door or sidewall of the vehicle on either side of each seating row, for a total of four sensors (two on each side of the vehicle). The side impact sensors are typically accelerometers or pressure sensors. Such a sensor suite is effective for sensing lateral collisions or impacts that occur on the sides of the seating rows.

Extending this concept to larger vehicles that may have three or more passenger seating rows would require six or more total side impact sensors.

SUMMARY

In a first embodiment disclosed herein, a method comprises detecting a lateral impact on a motor vehicle, detecting a yaw of the vehicle, and activating an occupant safety system if a) the impact has a magnitude above a first impact threshold and b) the vehicle yaw exceeds a yaw threshold. The occupant safety system is also activated if the impact magnitude is above a second impact threshold higher than the first impact threshold.

In a further embodiment, the occupant safety system is activated in a first mode if the magnitude of the impact is above the first impact threshold and the vehicle yaw exceeds the yaw threshold, and in a second mode if the impact magnitude is above the second impact threshold.

According to another embodiment, a method comprises detecting a lateral impact on a motor vehicle, detecting a yaw of the vehicle after the impact, and determining a longitudinal location of the impact by comparing a magnitude of the impact and a magnitude of the vehicle yaw. An occupant safety system may then be activated in a mode or manner based upon the longitudinal location of the impact.

According to another embodiment, a safety system for a motor vehicle comprises a sensor suite operative to detect a lateral impact and a vehicle yaw, an occupant safety system, and a control module receiving signals from the sensor suite. The control module activates the occupant safety system if either: a) an impact magnitude detected by the sensor suite is greater than a first impact threshold and a vehicle yaw magnitude detected by the sensor suite is greater than a yaw threshold; or b) the impact magnitude detected by the sensor suite is greater than a second threshold higher than the first threshold.

DETAILED DESCRIPTION

Figure 1:
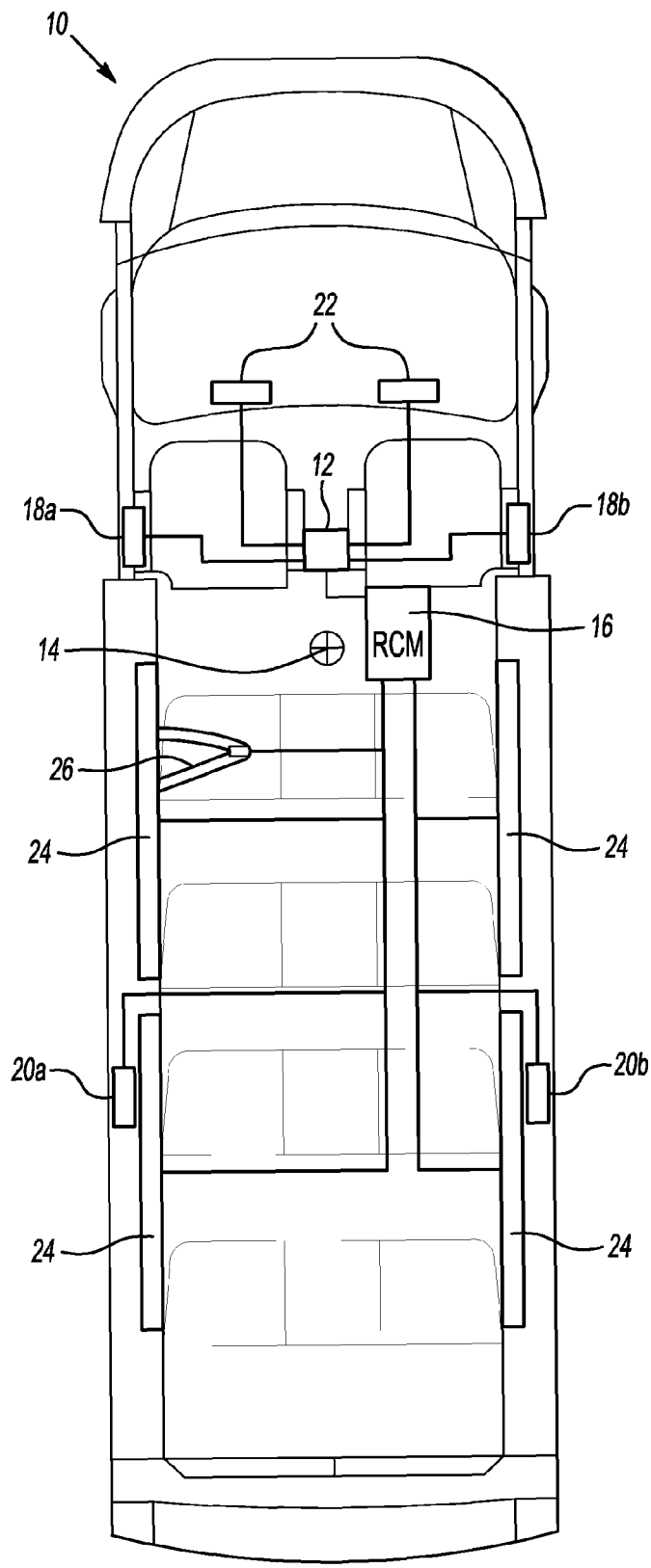
FIG. 1 is a schematic view of a vehicle having multiple seating rows equipped with an occupant safety system and a sensor suite.

FIG. 1 shows a motor vehicle 10 in the form of an extended-chassis passenger van having five rows of driver/passenger seating. Vehicle 10 has a vehicle dynamics sensor 12 comprising one or more accelerometers and/or angular rate gyros and is able to detect accelerations and/or rotations about one or more axes undergone by the vehicle body/chassis. Such dynamics sensors are well known in the automotive field and typically provide input signals to vehicle safety systems for determining that a crash or impact has occurred. Dynamics sensor 12 may also provide inputs to a vehicle dynamic stability control system (not shown), as is well known in the art. Dynamics sensor 12 is preferably located at or near the vehicle's center-of-gravity (CoG) 14, as is well known in the art.

Dynamics sensor 12 is in electronic communication with a restraint control module (RCM) 16. Forward side impact sensors 18a, 18b are located on, in, or near the doors or sidewalls of vehicle 10 adjacent the first/front seating row. Rear side impact sensors 20a, 20b are located on, in, or near the doors or sidewalls adjacent one or more of the rear passenger seating rows. Side impact sensors 18a -20b may be accelerometers, pressure sensors, or any type of sensor suitable for the function. Side impact sensors 18a -20b are in electronic communication and send signals to RCM 16. Dynamics sensor 12 and side impact sensors 18a -20b (along with any other sensors operative to detect forces acting on the vehicle) may be referred to as constituting a sensor suite.

Vehicle 10 is equipped with occupant safety devices/systems such as front air bags 22, side and/or curtain airbags 24, inflatable bolsters (not shown), and seat belts 26 (only one of which is shown for clarity) that may include pre-tensioning devices. The occupant safety devices systems 22-26 are in electronic communication with and controlled by RCM 16.

Figure 2:
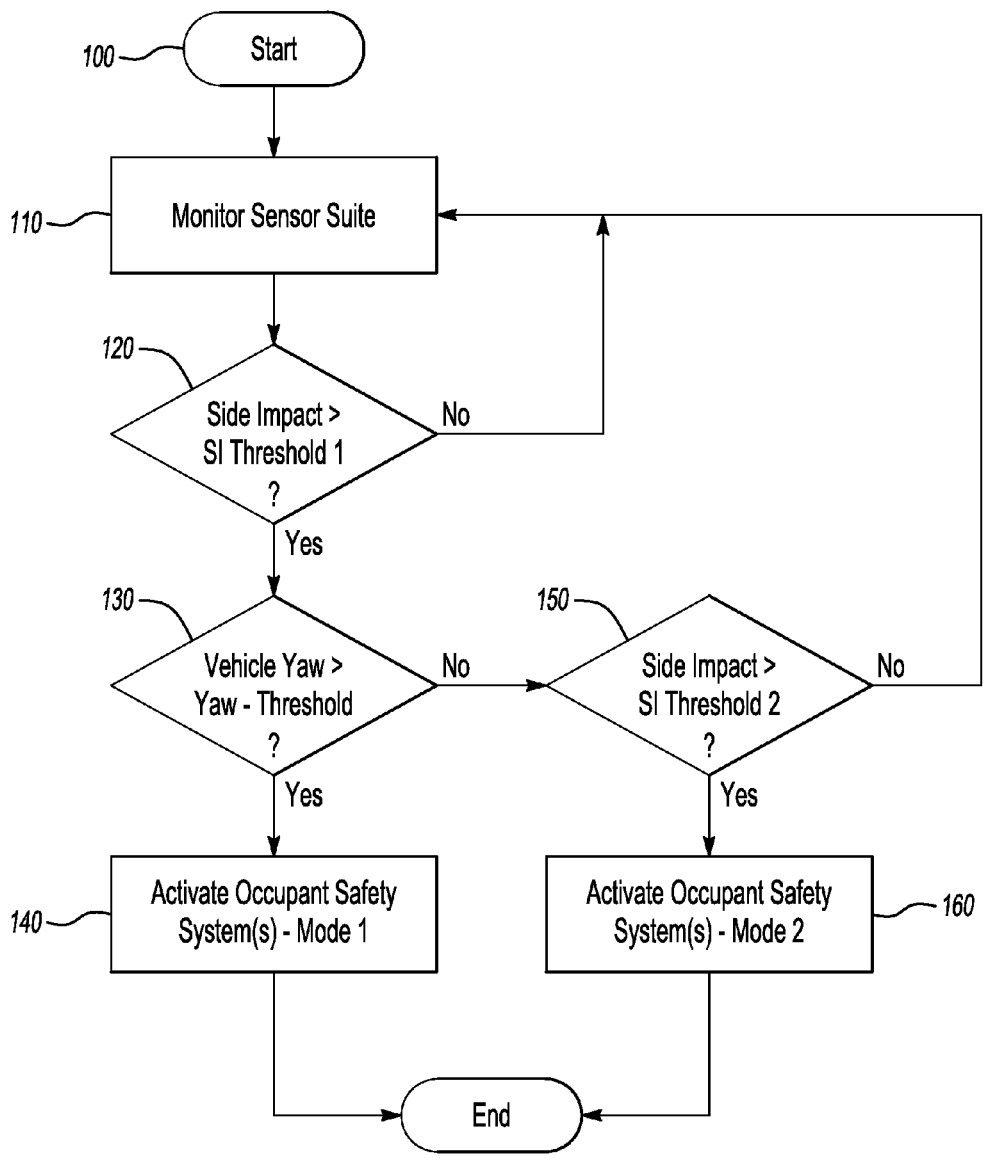
FIG. 2 is a flow chart showing a method of detecting side impact using vehicle yaw.

FIG. 2 is a flow chart depicting a method of detecting and classifying a side impact experienced by a vehicle and activating occupant safety devices/systems in response thereto. The method of FIG. 2 may be (but is not necessarily) implemented using a system substantially similar to that shown in FIG. 1.

The method starts at block 100, when the vehicle is has electrical power applied to its systems. At block 110, all appropriate sensors in the vehicle's sensor suite are monitored at substantially all times the vehicle is in operation (whether moving or stationary). The sensors that comprise the suite include all available side impact sensors, as well as vehicle dynamics sensors associated with a dynamic stability control system and/or crash detection (occupant safety) system.

At block 120, the magnitude of an impact detected by one or more side impact sensors is compared with a first side impact threshold (SI-Thrsh 1). If the detected side impact magnitude is lower than the first threshold, no activation of the occupant safety systems is triggered, and the method returns to block 110.

If at block 120 the magnitude of the side impact is greater than the first threshold ("YES"), the method progresses to block 130 where vehicle yaw detected by the sensor suite is compared with a yaw threshold value (Yaw-Thrsh). If the vehicle yaw is greater than Yaw-Thrsh (block 130, "YES"), occupant safety systems are activated or deployed (block 140). The mode of activation/deployment of safety systems is appropriate for the nature and severity of the combination of impact any yaw experienced by the vehicle and its occupants, as determined by an RCM (or similar controller), taking into account all available sensor signals.

If the vehicle yaw indicated by sensors is below Yaw-Thrsh (block 130, "NO"), at block 150 the side impact magnitude is compared with a second impact threshold (SI-Thrsh 2). The second impact threshold is higher than the first impact threshold. If SI-Thrsh 2 is exceeded, occupant safety systems are activated or deployed (block 160) in a manner determined by an RCM or similar appropriate for the conditions indicated by all available sensors.

The first impact threshold is established so that even if the detected side impact is not great enough to unequivocally indicate a side impact severe enough to require any safety system activation, the combination of the impact with sufficient vehicle yaw does require some type/mode of activation.

Blocks 140 and 160 are referred to as Mode 1 and Mode 2 activations, respectively, to indicate that the specifics of the system activations/deployments may be different in the two situations. For example, Mode 1 may comprise actions to protect occupants from the forces likely to be applied when the vehicle is yawing (spinning), while in Mode 2 those forces may not exist. In another example, Mode 1 may comprise activations more appropriate when the side impact has occurred at a location rearward of the vehicle CoG, while in Mode 2 may comprise activations more appropriate when the side impact has occurred closer to the vehicle CoG. The details of the system deployments in both modes are determined by logic applied by a RCM based upon all available and appropriate sensor signals.

It is understood that the term "vehicle yaw" may refer to yaw angle, yaw rate, or yaw acceleration, depending upon which of these parameters are detected/measured by the sensor suite. For example, a rotation (angular rate) sensor directly measures yaw rate, which may be integrated to find yaw acceleration and/or differentiated to find yaw angle. The threshold value of vehicle yaw may be expressed in any appropriate dimension compatible with the sensed and/or calculated values.

Figure 4A:
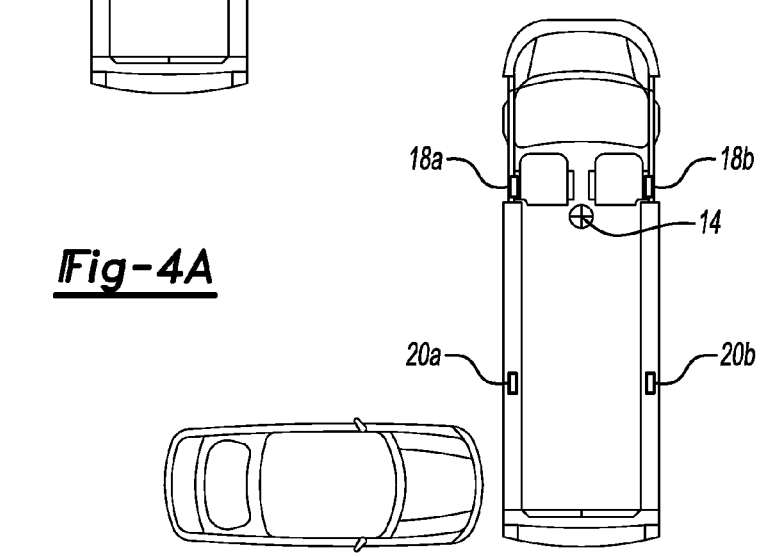
FIGS. 4A and 4B are schematic depictions of a second vehicle impact mode.
Figure 4B:
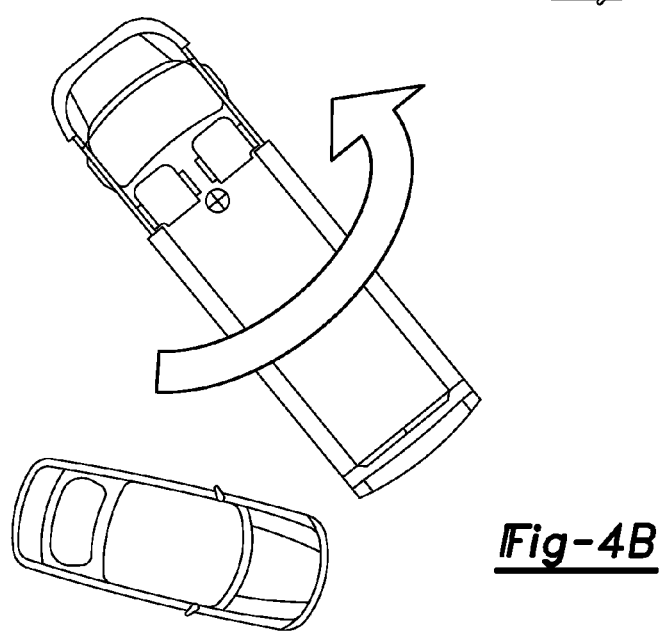

In FIGS. 4A and 4B, a vehicle 10 (referred to as the host vehicle) is struck by a vehicle 50 (the bullet vehicle) at a longitudinal location to the rear of the left rear side impact sensor 20a. When the bullet vehicle does not strike directly on a side impact sensor, the detected magnitude of the impact will likely be less than would be the case if the impact were directly on a side impact sensor. Hence, the impact magnitude detected by a side sensor may be less than what prior art vehicle safety algorithms (those that do not also consider vehicle yaw) would require for the activation of an occupant protection system.

Because the longitudinal location of the impact is a relatively large distance rearward of the vehicle's center-of-gravity (CoG) 14, the impulse of the impact may cause a significant counterclockwise yaw of the host vehicle 10 about (or approximately about) CoG 14. In such a case, if the two conditions shown in blocks 120 and 130 of FIG. 2 are met, the appropriate safety systems for this type of collision are activated.

In is also possible for a bullet vehicle travelling at a relatively low velocity relative to the host vehicle to strike the host vehicle directly on (or close to) one of the rear side impact detectors 20a, 20b. In this case, the detected side impact magnitude may be below the threshold required in prior art vehicle safety algorithms to activate occupant safety systems. But if the vehicle yaw caused by (or otherwise occurring simultaneously with) the impact is great enough, certain safety systems (for example, seat belt pre-tensioners and/or curtain airbags) may be deployed to prevent injury to the occupants.

Figure 3:
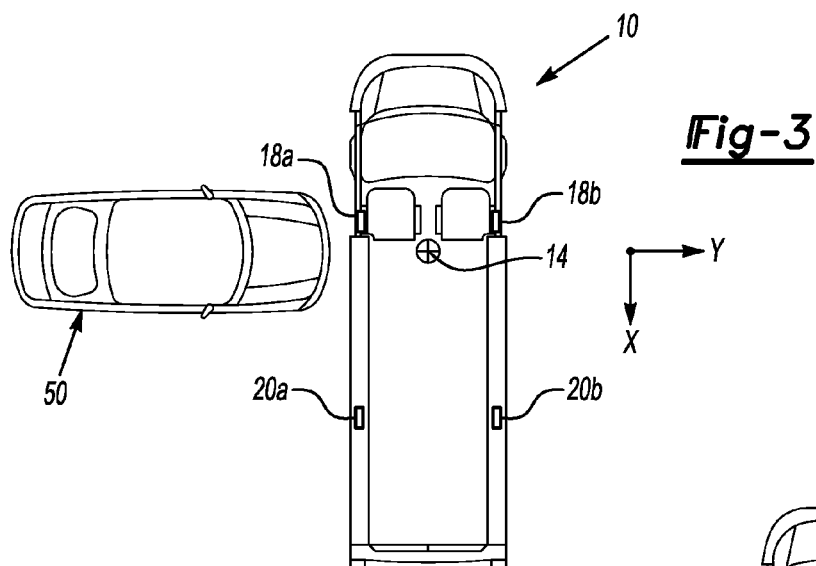
FIG. 3 is a schematic diagram of a first vehicle impact mode.

If, as in FIGS. 4A and 4B, only one side impact sensor is relied upon to detect impacts occurring over a large portion of the vehicle, the sensor may not be able to discriminate between a relatively low-force strike directly on (or close to) the sensor (in which case no restraint activation is required) and a higher-force strike at a greater longitudinal distance from the sensor (restraint activation required). Consideration of the vehicle yaw solves this problem, FIG. 3 depicts a collision in which host vehicle 10 is struck by bullet vehicle 50 relatively far forward on the host vehicle and relatively close to CoG 14. Assuming that bullet vehicle 50 is travelling with sufficient velocity, the fact that the bullet vehicle strikes the host vehicle relatively close to CoG 14 will result in a detected side impact magnitude greater than the first threshold (block 120, "YES" in FIG. 2), but the yaw magnitude will be less than Yaw-Thrsh (block 130, "NO"). If the side impact magnitude is greater than SI-Thrsh 2 (block 150, "YES"), appropriate occupant safety systems (Mode 2) are deployed.

A side or lateral impact, as the term is used herein, may refer to any collision between a host vehicle and another object that subjects the host vehicle to a force having a component directed along the vehicle's lateral axis. That is, the vector of the bullet vehicle need not be perpendicular to the longitudinal axis of the host vehicle.

Signals from the sensor suite may be used to establish an approximate longitudinal location at which the bullet vehicle has struck the host vehicle. In general, this may be determined following an assumption that if a relatively small magnitude side impact detected by one of the rear impact sensors and a subsequent relatively large vehicle yaw is detected by vehicle dynamics sensors, this implies that the side impact has occurred relatively far to the rear back on the host vehicle.

By considering vehicle yaw in combination with side impact magnitude, the present method allows detection of conditions that warrant restraint activation when, in the prior art, those conditions include a side impact too small in magnitude to justify a restraint activation. The present method may allow the "normal" side impact threshold (one which applies in the absence of significant vehicle yaw) to be set higher than otherwise, thus reducing the risk of false positives, while still providing superior occupant protection.

The ability to discriminate between different side impact conditions which result in varying amounts of yaw may have safety advantages in that restraints activation may be tailored in response or activations of the appropriate occupant safety systems in order to minimize the likelihood and extent of occupant injury.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   operating a side impact sensor disposed adjacent to a door or sidewall of a motor vehicle to detect a magnitude of a lateral impact on the motor vehicle;
   operating a vehicle dynamics sensor to detect a yaw of the vehicle;
   determining a longitudinal location of the impact on the vehicle by considering the impact magnitude and the vehicle yaw;
   activating an occupant safety system in a manner dependent upon the longitudinal location.

2. The method according to claim 1 wherein the occupant safety system is activated in a first mode if the longitudinal location is relatively far from a center-of-gravity of the vehicle, and the occupant safety system is activated in a second mode if the longitudinal location is relatively close to the center-of-gravity.

3. The method according to claim 2 wherein the first mode is adapted for a first collision type in which the vehicle experiences a relatively high level of yaw and the second mode is adapted for a second collision type in which the vehicle experiences a relatively low level of yaw.

4. The method according to claim 1 further comprising:
   detecting a first vehicle yaw prior to occurrence of the impact;
   detecting a second vehicle yaw after occurrence of the impact;
   determining a yaw impulse caused by the impact based upon a comparison of the first and second vehicle yaws; and
   using the yaw impulse to determine the manner of activation of the occupant safety system.

5. The method according to claim 1 wherein the vehicle dynamics sensor comprises an accelerometer.

6. The method according to claim 1 wherein the side impact sensor comprises a pressure sensor.

7. The method according to claim 1 wherein the step of activating an occupant restraint system comprises deploying a curtain airbag.

8. A method comprising:
   operating a side impact sensor disposed adjacent to a door or sidewall of a motor vehicle to detect a magnitude of a lateral impact on the vehicle;
   detecting a post-impact yaw of the vehicle;
   determining a longitudinal location of the impact based upon the magnitude of the impact and a magnitude of the post-impact yaw; and
   activating an occupant safety system based upon the longitudinal location of the impact.

9. The method according to claim 8 wherein step of activating the occupant safety system comprises:
   activating the occupant safety system in a first mode if the longitudinal location is relatively far from a center-of-gravity of the vehicle; and
   activating the occupant safety system in a second mode if the longitudinal location is relatively close to the center-of-gravity.

10. The method according to claim 9 wherein the first mode is adapted for a first collision type in which the vehicle experiences a relatively high level of yaw and the second mode is adapted for a second collision type in which the vehicle experiences a relatively low level of yaw.

11. The method according to claim 8 further comprising:
    detecting a pre-impact vehicle yaw;
    determining a yaw impulse caused by the impact based upon a comparison of the pre-impact and post-impact vehicle yaws; and
    using the yaw impulse to determine an activation mode of the occupant safety system.

12. The method according to claim 8 wherein the post-impact yaw is detected by a vehicle dynamics sensor.

13. The method according to claim 8 wherein the side impact sensor comprises a pressure sensor.

14. The method according to claim 8 wherein the step of activating an occupant restraint system comprises deploying a curtain airbag.

15. A safety system for a motor vehicle comprising:
    a vehicle dynamics sensor operative to detect vehicle yaw;
    a side impact sensor disposed adjacent to a door or sidewall of the vehicle operative to sense a magnitude of a lateral impact;
    an occupant safety system; and
    a control module receiving signals from the vehicle dynamics sensor and the side impact sensor and operative to:
    a) determine a longitudinal location of the impact based upon a magnitude of the sensed impact and a change in magnitude of the vehicle yaw from before the impact to after the impact; and
    b) activate the occupant safety system based upon the longitudinal location of the impact.

16. The safety system according to claim 15 wherein the control module activates the occupant safety system in a first mode if the longitudinal location is relatively far from a center-of-gravity of the vehicle, and activates the occupant safety system in a second mode if the longitudinal location is relatively close to the center-of-gravity.

17. The safety system according to claim 16 wherein the first mode is adapted for a first collision type in which the vehicle experiences a relatively high level of yaw and the second mode is adapted for a second collision type in which the vehicle experiences a relatively low level of yaw.

18. The safety system according to claim 15 wherein the side impact sensor comprises a pressure sensor.

19. The safety system according to claim 15 wherein the occupant safety system comprises a side curtain airbag.

* * * * *